United States Patent [19]

Morle

[11] 4,248,386
[45] Feb. 3, 1981

[54] ELECTROSTATIC DEPOSITION APPARATUS

[75] Inventor: Charles W. Morle, Gerrards Cross, England

[73] Assignee: Ransburg Corporation, Indianapolis, Ind.

[21] Appl. No.: 951,571

[22] Filed: Oct. 16, 1978

[30] Foreign Application Priority Data

Oct. 31, 1977 [GB] United Kingdom ............... 45196/77

[51] Int. Cl.³ .............................................. B05B 5/00
[52] U.S. Cl. .................................... 239/707; 239/708; 310/339; 361/227; 361/235; 361/260
[58] Field of Search ....................... 239/690, 691–708; 361/227–229, 235, 226, 260; 310/339

[56] References Cited

U.S. PATENT DOCUMENTS

| | | | |
|---|---|---|---|
| 3,174,419 | 3/1965 | Sable | 310/339 X |
| 3,608,823 | 9/1971 | Buschor | 239/698 |
| 3,997,817 | 12/1976 | Secker | 361/235 X |
| 4,120,015 | 10/1978 | Haller | 239/696 X |
| 4,156,825 | 5/1979 | Kondo | 310/339 |
| 4,165,022 | 8/1979 | Bentley | 239/704 |

Primary Examiner—Richard A. Schacher
Attorney, Agent, or Firm—Jenkins, Coffey, Hyland, Badger & Conard

[57] ABSTRACT

A hand-held manually operable deposition gun for projecting electrostatically charged particles. The gun includes at its front end means for discharging the particles, which may be either liquid or solid, and an electrode for electrostatically charging the particles. The electrode is maintained at a high unidirectional voltage of several tens of kilovolts by connection to a piezoelectric generator through a voltage integrating device, both mounted at the rear of the gun. The piezoelectric generator is actuated by a motor-driven impulse means also located at the rear of the gun. A trigger mounted on the gun activates both the motor and the flow of particles from the gun.

14 Claims, 3 Drawing Figures

ELECTROSTATIC DEPOSITION APPARATUS

This invention relates to electrostatic deposition apparatus of the type in which a material to be deposited is fed to a hand-held device, usually referred to as a gun, from which the material is discharged in particulate form. If the material to be deposited is fed to the gun as a liquid, then the gun will function to atomize the material and to project the atomized material from a discharge orifice of the gun. In case of liquid material, atomization can be effected by hydrostatic pressure imparted to the liquid in its supply to the gun, or atomization may be effected with the aid of an atomizing gas, conveniently air. Multiple components can be fed to guns of this kind, for example two or more components which are mixed, may be with chemical reaction, to provide a deposited coating and particulate material, for example in the form of reinforcing fibres, can also be projected at the same time for embodiment in the deposited coating.

More specifically, the invention concerns apparatus of this type in which the deposition of the material from the gun on the surface to be coated is promoted with the aid of an electrostatic field established between an electrode on the gun and an article at earth potential, conveniently the article itself. The electrostatic field may also effect or contribute to the atomization of liquid material atomized by means of the gun.

The voltages which are required in the exercise of electrostatic deposition are high by industrial standards, usually of the order of tens of kilovolts and occasionally extending to 100 kilovolts or more. The current required to operate successfully electrostatic deposition equipment of this kind is relatively small, and may range from a few tens of microamperes up to some hundred of microamperes, so that despite the high voltage the total power required to operate such guns is low.

The high voltage is usually applied to an electrode disposed forwardly of the gun, and in a position where it is accessible to the user, but the techniques of making the gun so operated safe against the hazard of shock and fire are now well established.

There is considerable latitude in the design of the means adopted for providing from a conventional mains supply the high voltage for operating the gun. For example, where the mains supply is the conventional alternating current, there can be used a suitable voltage step-up transformer, with a high voltage secondary the output of which is rectified by a suitable static rectifier and smoothed by means of a capacitor. Such a system can be designed without difficulty to give a high standard of performance and reliability but the components, especially the power transformer, are expensive and may be bulky. Such system also has the disadvantage that its short circuit output energy is dangerously high. Other units have been suggested, for connection to a mains supply, for producing the necessary high voltage which is then fed over a suitable cable to the gun. One of the disadvantages of this type of apparatus is that a cable which is capable of withstanding tens of kilovolts is necessarily heavy and stiff and imposes a degree of limitation of the facility of manipulation of the gun.

Moreover, in the event of damage to the high voltage cable there may be a disruptive discharge of appreciable energy due to the power stored in the capacitor of the supply unit and the supply cable. Where guns are used with coating materials which include volatile inflammable solvents, such a spark can give rise to fire or explosion.

To improve the ease of manipulation of a hand held gun and to reduce the risk attendant on the use of a high voltage supply cable, guns have been suggested in which electric current is fed to the gun at low voltage, with an electrical voltage step-up device used on the gun to give a high voltage output. In these systems it is not feasible to use mains supply alternating current to feed the gun, for a suitable voltage step-up device such as a transformer, operating at mains frequency is then usually too large and too heavy to be conveniently accommodated on the gun. Alternating current at a frequency much higher than mains frequency can be used, but the voltage step-up device remains a difficult component to design within the limitation of use, and a special high frequency generator is required.

The present invention is concerned with means for generating the necessary high voltage for an electrostatic deposition gun, which lends itself to a compact assembly and for this purpose makes use of a piezoelectric element. The well-known property of such a piezoelectric material is that an element made of the material is distorted when a voltage is applied to electrodes provided on the element or, conversely, a voltage is generated on the electrode when the element is mechanically stressed. If such an element is subjected to an implusive force a high voltage can be developed, and this effect is used in some devices to produce isolated sparks, for example in gas igniters.

With the invention, an electrostatic hand gun is provided, on the hand-held body of which is provided a piezoelectric high voltage generator; impulse means are also provided on the gun for applying to a piezoelectric element of the generator to a rapid succession of mechanical impulses, to produce corresponding high voltage pulses on the electrodes of the element. Such voltage pulses are not of themselves directly suitable for application to the high voltage electrode of the gun, and a voltage integrating device is used, comprising rectifying and smoothing means, to produce a unidirectional high voltage.

More than one piezoelectric element can be used, actuated from the same impulse means. The impulse means is conveniently driven from a small motor on the gun, preferably electric, though in some cases it may be advantageous to use an air motor.

Features and advantages of the invention will appear from the following description of embodiments thereof, given by way of example, and the accompanying drawings, in which.

Figure 1:
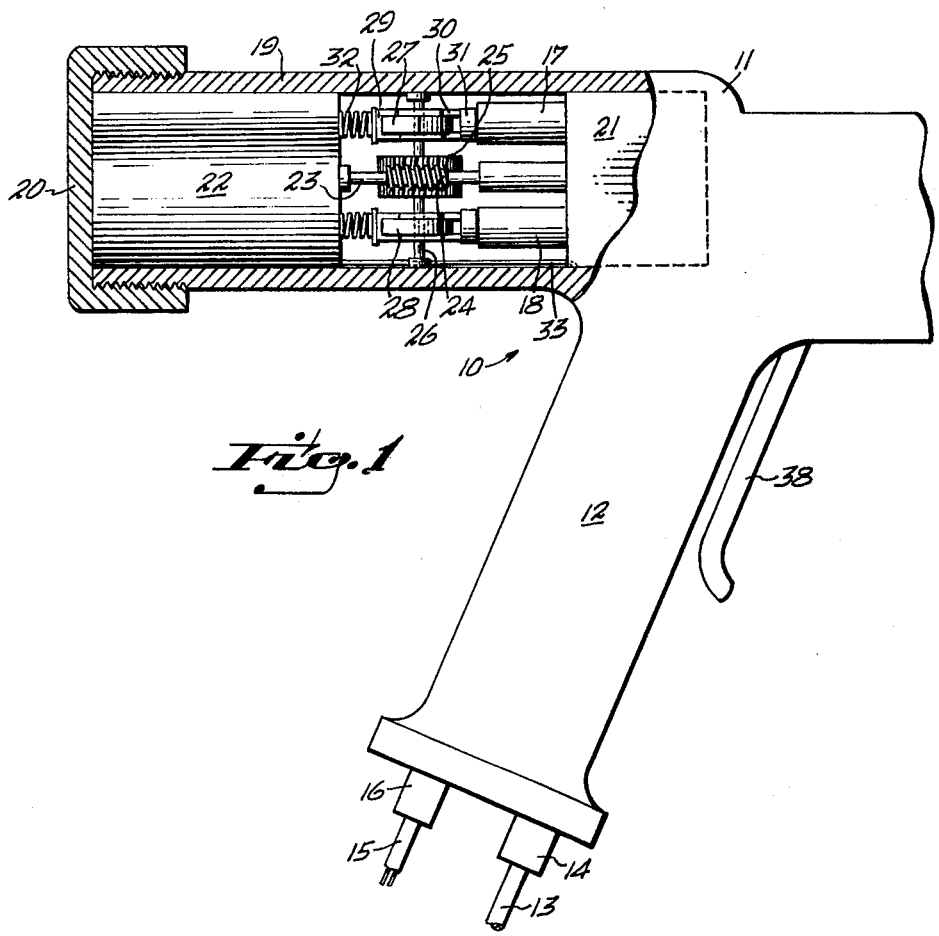
FIG. 1 is a fragmentary view of an electrostatic deposition gun, partly broken away.

The gun 10 shown in FIG. 1 is intended for use in an electrostatic deposition system and the gun is adapted to be supplied with deposition material through a supply hose or pipe and if necessary with a supply of compressed air for atomizing the deposition material, and, further with an electric current supply.

The gun includes a body portion 11, with a depending handle portion 12. The forward part of the body portion 11 of the gun can be constructed in any convenient manner such that in operation deposition material is discharged in particulate form, in the vicinity of an electrode which is maintained at high voltage with respect to the article to be coated, so that there is established between the electrode and the article an electrostatic deposition field.

The construction and arrangement of atomizing and charging means in electrostatic deposition systems is well-known, for example, as shown in U.S. Pat. No. 3,169,882 and will not be further described. In known manner, the electrostatic field can be used not only to produce the electrostatic deposition field, but can be used also to effect or promote atomization of the deposition material. In the embodiment of the invention shown, the deposition material, such as paint, can be supplied to the gun through hose 13 connected to coupling 14, at the extremity of the handle portion 12, and an electric cable 15 can enter the extremity of the handle portion through gland 16.

With the apparatus in accordance with the present invention, the high voltage is developed with the aid of a piezoelectric material. As shown, piezoelectric elements, of which two are indicated at 17 and 18 are mounted in a hollow extension 19 at the rear of the body portion of the gun, closed by a screwed cap 20. At one end the piezoelectric elements engage a rigid hard material 21. An electric motor 22 is mounted in the rear part of the extension of the gun body and the spindle 23 of the motor drives a worm wheel 24, which engages a worm pinion 25 on a cross-shaft 26, suitably journalled at its ends in the body of the gun. The cross-shaft 26 carries two snail cams 27, 28 which are engaged by respective cam followers of which one is shown at 29 in FIG. 2. Cam follower 29 is coupled by a yoke 30 to a hammer 31; the yoke is biased by a spring 32, in which energy is stored and then released to drive the hammer 31 against the end face of the associated piezoelectric element. Preferably, the two cams are arranged in opposite phase.

The motor 22 is energized from the power supply fed in over cable 15, through connecting leads 33.

Figure 2:
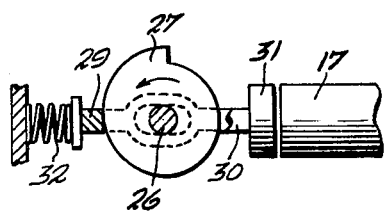
FIG. 2 is a detail view, taken at right angles to the view of the section part of FIG. 1.

When energized, the motor rotates at high speed, driving the cross-shaft 26, driving the cams in the anti-clockwise direction as viewed in FIG. 2. The cam follower 29 is moved by the action of the cam, against the compression of spring 32, until it drops abruptly at the end of the cam face, causing the hammer 31 to strike the associated element, and thereby generating a substantial voltage piezoelectrically by means of the element.

The piezoelectric material is of known material, and is preferably of the basic lead zirconate titanate type. This material can be manufactured by firing an appropriate mix of the starting components, to produce a ceramic microcrystalline body of desired shape, making due allowance for the shrinkage which occurs on firing. The ultimate properties of the material can be substantially modified by the inclusion of small quantities of additives in known manner.

The fired body, which can be finally ground to the desired dimensions if necessary, is provided with electrodes on two opposite, flat and parallel faces; the electrodes can be applied by firing coating compositions on to the surfaces, or they can be applied by metallizing. The fired body is not piezoelectric, but the body is then polarized by applying to the electrodes a high direct voltage which approaches the break-down potential gradient of the material of the element, and this polarization develops the piezoelectric properties of the element. With material of the type described a maximum piezoelectric coupling coefficient of about 0.35 is possible.

When the element has been polarized in the manner described, the application of a compressive force on the element in the direction between the electrodes results in the generation of a voltage on the electrodes. The voltage is a function of the magnitude of the applied force and the dimensions of the element, especially the dimension in the direction between the electrodes. A voltage peak appropriate for energizing the charging electrode of the gun can be obtained with an element of the constituency described which has this dimension in the order of 15 mm. The elements are preferably in the shape of right prisms, of circular, square or rectangular section; a convenient diameter is in the range from about 7 to 14 mm.

Figure 3:
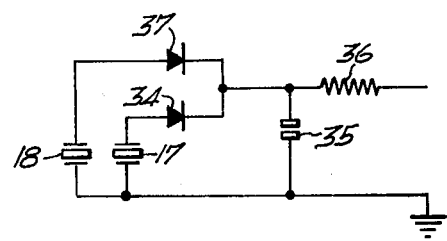
FIG. 3 is a simplified circuit diagram.

The individual voltage pulses thus produced are not suitable for directly supplying the high voltage electrode of the gun, since the pulses are of short duration with longer intervals between them, and the pulses are therefore applied to means for producing a unidirectional voltage which has a ripple component of acceptable amplitude. To this end, the pulses are fed to an integrating circuit including rectifier and smoothing means in a suitable housing. A simple circuit is shown in FIG. 3 which is suitable for this purpose. The electrodes of the element 17 are connected through rectifier 34 to smoothing capacitor 35, and the rectified and smoothed output is then fed through safety resistor 36 to the high voltage electrode of the gun. The second element 18 is connected through a second rectifier 37 to the same capacitor 35.

A rectifier multiplier arrangement can be used if desired.

In this way, the gun is operated at low voltage, avoiding the danger and inconvenience due to feeding the gun with high voltage through a suitable cable.

In an alternative arrangement, the piezoelectric element or elements can be operated in a resonant system, with suitable feedback and in conjunction with active semiconductor elements such as transistors, the voltage developed resonantly on the piezoelectric element or elements being similarly rectified and multiplied to supply the output electrode.

The piezoelectric element or motor or both can be arranged as an integral element or elements which can be easily withdrawn from the gun body, by unscrewing the cap 20 and withdrawing the assemblies rearwardly from the gun.

The atomization of the deposition material can be effected in the forward part of the gun in any suitable known way, for example by supplying the material to the gun under hydrostatic pressure and allowing the material to emerge from a small atomizing orifice, or atomization can be effected with the aid of compressed air. In the latter case it is convenient to use an air motor for motor 22 used to produce the mechanical impulses on the piezoelectric element, using the one air supply to the gun both to drive the motor and to effect atomization.

The gun can be provided in the usual manner with a trigger control, as at 38, for controlling the discharge of material from the gun and the application of high voltage to the charging electrode.

What is claimed is:

1. A hand-held electrostatic deposition gun including a body, means for supplying deposition material to the gun and for discharging the material from the gun in atomized form, a high voltage electrode for establishing an electrostatic field between the gun and the article on which material is to be deposited, for electrostatically charging the material and promoting the deposition of the material on the article, wherein said gun includes means on said body for generating high voltage for application to said electrode, said high voltage generating means including a piezoelectric element, means for supplying energy to said gun to cause said element to be stressed and thereby develop pulses of high voltage, and means for rectifying and smoothing said high voltage pulses to produce a unidirectional high voltage for application to said electrode, means for utilizing such energy for imparting mechanical impulses to said piezoelectric element, said mechanical impulse imparting means including a motor, energy storage means for storing energy from the output of said motor and for periodically releasing the stored energy to apply impulses to said element, said gun further including air operated atomizing means and said motor being air operated, said atomizing means and said motor being supplied from a common air supply to said gun.

2. A gun according to claim 1, wherein said energy storage means is a spring, and comprising a cam driven from said motor and a cam follower associated with said spring for loading and releasing said spring.

3. A gun according to claim 1, and comprising a plurality of said piezoelectric elements operated successively.

4. A high-voltage supply for use in a hand-held electrostatic deposition gun having a discharge electrode, comprising
 a piezoelectric generator to supply voltage to the discharge electrode; and
 a power-driven activation means, said activation means alternately, rapidly, and regularly stressing and destressing said piezoelectric generator, the stressing occurring in a time period much shorter than the destressing, said piezoelectric generator comprising a plurality of piezoelectric elements, each including a separate activation means for stressing and destressing the piezoelectric elements in alternating relationship, each element providing a voltage output.

5. The supply of claim 4 wherein said activation means includes a hammer element for striking said piezoelectric generator.

6. The supply of claim 5 wherein said activation means includes a cam and cam follower for controlling the movement of said hammer element.

7. The supply of claim 4, 5, or 6 additionally comprising means connected to the voltage output of said piezoelectric generator for rectifying the voltage for supply to the discharge electrode.

8. The supply of claim 7 additionally comprising a capacitor coupled to the output of said rectifying means to store rectified voltage.

9. The supply of claim 7 additionally comprising a resistor coupled to the output of said rectifying means and the discharge electrode.

10. The supply of claim 8 additionally comprising a resistor coupled to the output of said rectifying means and the discharge electrode.

11. The supply of claim 4, additionally comprising a rectifying means coupled to the voltage output of each piezoelectric element, the output of each rectifying means being coupled to a single rectifying output for the discharge electrode.

12. A hand-held electrostatic deposition gun having a body, a discharge electrode, and a high-voltage supply for the discharge electrode, comprising
 a piezoelectric generator having a supply electrode which provides a voltage output;
 a hammer element for mechanically stressing and destressing said piezoelectric generator;
 a cam and cam follower mechanism, said hammer being connected for movement with said cam follower, and means for rotating said cam, said cam providing for movement of said cam follower over a relatively longer period of time during which said hammer is retracted from said piezoelectric generator and providing for movement of said cam follower over a relatively shorter period of time during which said hammer strikes said piezoelectric generator, resulting in an electrical impulse output from said generator,
 means for biasing said hammer toward said piezoelectric generator, said piezoelectric generator comprising a plurality of piezoelectric elements and a cam, cam follower, and hammer for each element, each element being stressed and destressed in alternating relationship and each having a voltage output.

13. The gun of claim 12 wherein the means for rotating the cam includes
 a motor, having a shaft extending generally along the body;
 a worm, coupled for rotation with the shaft of said motor; and
 a worm gear engaging and driven by said worm, and having a shaft, the cam being connected to said worm gear shaft.

14. The gun of claim 12 wherein said high voltage supply includes rectifying means coupled to the voltage output of each piezoelectric element, the output of each rectifying means being coupled to the discharge electrode.

* * * * *